(12) United States Patent
Bingol et al.

(10) Patent No.: US 10,157,225 B2
(45) Date of Patent: Dec. 18, 2018

(54) CONTENT SENSITIVE DOCUMENT RANKING METHOD BY ANALYZING THE CITATION CONTEXTS

(71) Applicant: BOGAZICI UNIVERSITESI, Istanbul (TR)

(72) Inventors: Osman Haluk Bingol, Istanbul (TR); Metin Doslu, Istanbul (TR)

(73) Assignee: BOGAZICI UNIVERSITESI, Istanbul (TR)

( * ) Notice: Subject to any disclaimer, the term of this patent is extended or adjusted under 35 U.S.C. 154(b) by 0 days.

(21) Appl. No.: 15/515,602

(22) PCT Filed: Dec. 4, 2015

(86) PCT No.: PCT/TR2015/050228
§ 371 (c)(1),
(2) Date: Mar. 30, 2017

(87) PCT Pub. No.: WO2016/099422
PCT Pub. Date: Jun. 23, 2016

(65) Prior Publication Data
US 2017/0293686 A1 Oct. 12, 2017

(30) Foreign Application Priority Data
Dec. 17, 2014 (TR) .............................. a 2014/15332

(51) Int. Cl.
*G06F 17/30* (2006.01)
*G06F 17/27* (2006.01)

(52) U.S. Cl.
CPC ...... *G06F 17/30728* (2013.01); *G06F 17/277* (2013.01); *G06F 17/3053* (2013.01); *G06F 17/30401* (2013.01)

(58) Field of Classification Search
CPC ........... G06F 17/30011; G06F 17/3061; G06F 17/30722
See application file for complete search history.

(56) References Cited

U.S. PATENT DOCUMENTS 6,457,028 B1    9/2002  Pitkow et al.
9,075,873 B2 *  7/2015  Vanderwende ... G06F 17/30728
(Continued)

FOREIGN PATENT DOCUMENTS

EP      0637805 B1      5/2000
WO   WO2006001906 A2   1/2006

OTHER PUBLICATIONS

Liu, Xiaozhong, et al. "Full-text based context-rich heterogeneous network mining approach for citation recommendation." Digital Libraries (JCDL), 2014 IEEE/ACM Joint Conference on. IEEE, 2014. (Year: 2014).*

(Continued)

*Primary Examiner* — Brian L Albertalli
(74) *Attorney, Agent, or Firm* — Gokalp Bayramoglu (57) ABSTRACT

This invention relates to a method which provides, showing as well the relevant documents to the user even if the said documents that are closely related to the subject do not contain the keywords that are entered for search in their content, by analyzing citation contexts of every document in a data pool containing documents that are citing or linking to at least one document. In an alternative embodiment of this method, in the case when the documents cited by using the entered keywords are cited by other documents using other keywords, these said other keywords are considered as similar terms and the search is conducted as well by including these said similar terms.

14 Claims, 5 Drawing Sheets

(56) References Cited

U.S. PATENT DOCUMENTS

| | | |
|---|---|---|
| 2002/0156760 A1* | 10/2002 | Lawrence ......... G06F 17/30728 |
| 2005/0278325 A1* | 12/2005 | Mihalcea .............. G06F 17/277 |
| 2007/0288442 A1* | 12/2007 | Iwayama .......... G06F 17/30011 |
| 2008/0071739 A1 | 3/2008 | Kumar et al. |
| 2010/0268708 A1 | 10/2010 | Zhang et al. |

OTHER PUBLICATIONS

Caragea, Cornelia, et al. "Citation-enhanced keyphrase extraction from research papers: A supervised approach." Proceedings of the 2014 Conference on Empirical Methods in Natural Language Processing (EMNLP). 2014. (Year: 2014).*

Kim, Youngho, et al. "Automatic suggestion of phrasal-concept queries for literature search." Information Processing & Management 50.4 (2014): 568-583. (Year: 2014).*

Qin, Jian. "Discovering semantic patterns in bibliographically coupled documents." (1999). (Year: 1999).*

Giles, C. Lee, Kurt D. Bollacker, and Steve Lawrence. "CiteSeer: An automatic citation indexing system." Proceedings of the third ACM conference on Digital libraries. ACM, 1998. (Year: 1998).*

Ritchie, Anna, Stephen Robertson, and Simone Teufel. "Comparing citation contexts for information retrieval." Proceedings of the 17th ACM conference on Information and knowledge management. ACM, 2008. (Year: 2008).*

\* cited by examiner

Figure 2e $$F = \begin{pmatrix} & a_1 & a_2 & a_3 & a_4 & a_5 & a_6 \\ \alpha_1 & 0 & 0 & 1 & 2 & 0 & 1 \\ \alpha_2 & 0 & 0 & 0 & 1 & 0 & 1 \\ \alpha_3 & 0 & 0 & 0 & 0 & 0 & 2 \\ \alpha_4 & 0 & 0 & 1 & 0 & 1 & 0 \\ \alpha_5 & 0 & 0 & 1 & 0 & 1 & 0 \end{pmatrix}$$

CONTENT SENSITIVE DOCUMENT RANKING METHOD BY ANALYZING THE CITATION CONTEXTS

CROSS REFERENCE TO RELATED APPLICATIONS

This application is the national phase entry of line national Application No. PCT/TR2015/050228, filed on Dec. 4, 2015, which is based upon and claims priority to Turkish Patent Application No. TR2014/15332, filed on Dec. 17, 2014, the entire contents of which are incorporated herein by reference.

TECHNICAL FIELD

The present invention relates to a method, which prepares the way for finding as well the documents which are related to the subject but which do not include the entered keywords, by searching the entered keywords in the citation contexts of the documents.

BACKGROUND OF THE INVENTION

The field of information retrieval is a field founded on the problems of selecting documents, that are related to a query made, from a document pool, and ranking the selected documents with respect to relevance. There are a number of techniques developed on this subject including term frequency—inverse document frequency (tf-idf). Basically, every document is addressed by some terms, meaning that, full-text indexing. Traditionally, every term corresponds to a dimension in a multi-dimensional vector space. Later, documents are represented as points in this space according to the terms they include. They are mapped to a point in this space by means of the terms included in the search. Afterwards, the terms that are "close" to the query are selected and this closeness is measured as distance in the vector space.

Generally the documents do not have any relation between documents; they are independent from each other. On the other hand, some document types such as web pages or scientific abstracts, by nature, have connections to the others in the forms of hyperlinks or citations.

Google search engine, while using the relevance based on the document content, uses PageRank on the hyperlink network for estimating the rank of the selected document [2]. In the PageRank approach, every document is assigned an importance value called PageRank. PageRank of a document increases as the document gets more links from documents with higher PageRank.

Even though the rank value, when Google is in question, is independent from the query, HITS approach is dependent to the query [6]. For each query, a set of "hubs" and a set of "authorities" are defined. The hypothesis is that good hubs refers to good authorities which contain high quality information and vice versa.

It is claimed that not only the document itself, but also the documents citing it contains information about the document that is cited. The part of the citing document, which contains the citation is called "citation context". It is believed that the citation context contains important information about the document that is cited [5, 8, 9].

In the state of the art, patent document numbered U.S. Pat. No. 6,457,028 B1 discloses gathering the related documents from the documents that are linked to each other, by using the method of co-citation analysis. If a document A is giving links to the documents B and C, then B and C are thought to be relevant to each other. If B and C receive links together not only in A but also M multiple documents, the relevance of them are considered to be strengthened. In this approach, only the condition whether a link is present between the documents is utilized, however, context information that is used when citing is not taken into account.

In the patent document numbered WO2006/001906 A in the background of the invention, a text document is worked on and word groups are formed from the text. These groups are related by a relationship. By this, a network consisting of word groups as nodes and two groups are connected by an edge if they are related is obtained. The nodes of this network are ranked by known techniques such as PageRank and HITS. By this, word groups are also ranked. This ranking is used in determining the keys that would explain the document, determining the important sentences. In this patent document, a single text document is worked on and the words in the text is used to obtain a network. However, in the suggested invention, the network is totally different from this. In the suggested invention, there is a plurality of documents which give reference to each other and in addition to the state of the art operations realized by the words in the document such as finding keywords and abstracting the text, the reference context of the referring documents is used. By this, a network is formed, however, in the formed network, the document itself is shown by a node. A reference given front one document to a second document is shown by an edge. Hence, the obtained network is a directional edge-labeled network. Additionally, the context of the referring document at the referred place is also added to the directional edge as a label of this connection.

In the state of the art, patent document numbered US20080071739 A1 focuses on the additional information about the relevant documents selected by the search engine. The search engine selects the documents suiting the terms of the query of the user. It, not only gives the title and the link of the document while showing them to the user, but also tries to give brief information about the document in order to help the user it, under normal circumstances, compiles this short information from the content of the document. In some cases, a text, to be compiled like this, might not be present inside the selected document, moreover in some cases; no text might be present in the content. In some cases, the search engine might not find the content to return the short information from. In the search engine, additional text information, which might help in this subject, can be gathered from the documents referring to the selected document. This patent suggests a method in this subject. The terms that are present in the place of citation in the referring document to are compiled as explanatory information for the selected document and are presented to the user. However in this document, as opposed to the suggested invention, the terms that are present in the referred place, meaning that in the context of reference, are not used during the search engine selection. As a result, the documents, that do not contain the keywords that are used while searching, could not be selected by the search engine.

In the patent document numbered EP0637805 B1 in the background of the invention, finding the lexical meaning of a word passing in a text is studied. A word having multiple meanings, the same word receiving different affixes by the linguistic rules according to the place it is used are the obstructing factors. Already present techniques are used for stripping the affixes and reducing the word to its principals. Once the principal word is found, in order to infer which of the multiple meaning of the word is used in the text, the sentence in which the word passes is also analyzed. By using the context information, it is tried to understand which of the different meanings of a word is. Additionally, multiple word connections with the context of the word are also utilized. If we use one of the given examples, when the term passes like "under the table" gives a totally different meaning than when the term "table" passing in the text is searched by itself. In this patent, close approaches to the approach in the suggested invention are present. There are (i) using the context of the searched word, (ii) using not only the words but also the word groups. On the other hand, the subject here is to infer in which meaning the word passing in the target text is used. However, in the suggested invention, there is no single texts and a word, the meaning, of which is to be found in the text. The content of a text in a group of referring texts, and hence, in order to be found when it is searched, the context in which the reference is given from the other referring texts is used.

SUMMARY OF THE INVENTION

The object of the invention is to provide a method, which prepares the way for finding the documents which are related to the subject even if they do not contain the entered keywords, by searching the entered keywords in the citation contexts of the documents.

Another object of the invention is to provide a method which enables finding the documents, that are closely related to the subject but can only be retrieved by similar words other than the entered keywords.

During the search, a methodology that is suitable for both relevance and significance is needed. A document defines the main contributions of the cited document and uses related keywords when citing that document. This, in turn, gives very valuable information about the relevance of the cited document to the subject in question. Documents which include the related terms and that are heavily cited mean important contributions to the subject in question, and thus, having more citations mean the cited document is more significant.

The citation contexts of a citing document might have numerous possible meanings, it might be off topic, or it might bring criticism more than approval. It is hart do determine the content of the citation automatically. However, as a whole, if an article is cited by multiple articles containing the same terms, it receives a kind of collective approval in the field that the term represents. It can infer the cumulative understanding of the crowd related to the cited document, from the cumulative citation contexts of the citing articles.

The biggest contribution of the inventive method is that it can determine important documents about the target subject even though they do not contain a term representing the subject in question. In this method, using the citation contexts helps to find the articles in the following cases especially when it is not possible to locate them using the full text indexing methods:

In the case that an article presents a new concept and then another person founds another concept over the first concept, if important articles for the second concept are being searched, articles relating to the first concept are also wanted to be looked at. For example, "Hadoop" is derived from the Google File System and the "MapReduce" articles of Google. In this case, if someone is looking for important articles about "Hadoop", even if they do not contain the term "Hadoop", the articles about "MapReduce" are also needed to be looked at.

When they are closely related concepts, for example $c_1$ and $c_2$, it is possible for a document to mention $c_1$ but not $c_2$. In the approach of full text, it is not possible to reach documents about $c_2$. For example, in complex networks, the concepts "power law" and "small world" are closely related. However some documents mentioning "small world" without mentioning "power law" could be found. In cases like this, when a person looks for important documents about "power law", he should also look at documents about "small world".

In this invention, the words "citation" and "link" are used interchangeably. While articles, laws, patents might be given as examples to the citations between the documents, links established from web pages to other web pages might be given as examples to links. All of the methods disclosed in this invention could be used, as the given examples, for any documents or web page that are citing or linking each other.

BRIEF DESCRIPTION OF THE DRAWINGS

Methods in order to fulfill the objects of the present invention are illustrated in the attached figures, where.

ELEMENTS SHOWN IN THE FIGURES ARE NUMBERED AS FOLLOWS

100. Context sensitive search method

110. Separating the citation contexts

120. Identifying the meaningful keywords/word groups from the citation contexts

130. Forming the citation network, as a directed graph, from the citing article to the cited articles

140. Writing the keywords, citing and cited documents in a table T

150. Entering the keywords/word groups to start a search

160. Searching the keywords word groups in the table T

170. Taking the cited documents corresponding to the keywords in a pool of related documents

180. Ranking using a ranking algorithm

Method of searching with like terms

210. Entering the keywords/word groups

220. Inferring the terms which are similar to the entered keywords

230. Conducting a search in the table T for the first keywords/word groups entered.

240. Conducting a search in the table T for the inferred similar terms

250. Forming a relating document pool for all results in the table T corresponding to the entered keywords and similar terms 260. Ranking the documents taken from the document pool using a ranking algorithm

DETAILED DESCRIPTION OF THE INVENTION

Citation context sensitive search method (100), which provides access to the related documents by the chosen keywords, essentially comprises the steps of;

extracting the citation contexts of each document, that cites at least one document, in a database containing the documents (110), identifying meaningful keywords/word groups from the citation context of each document (120), forming the citation network, an edge-labeled directed graph, where nodes are the documents. There is an edge from the citing article to the cited article and the edge is labeled by the inferred keywords (130), constructing a table T (see Table 1) which contains the citing document, the cited document, and the inferred keywords in the citation (140), entering the keywords/word groups to initiate a search (150), identifying citing and cited documents by searching the entered keywords in the table T (160), forming a relating document pool by adding the cited documents identified in (160), (170), ranking the documents taken to the related document pool by using any ranking algorithm (180).

In the subject matter of citation context sensitive searching method (100), in order to provide access to the related documents via selected keywords, firstly, a table T consisting of keywords used for citing, along with citing and cited documents based on the keywords that are already present in the citation context, needs to be constructed. Once the table T is formed, all searches are conducted through this table T.

In order to form the table T, first of all, the citation context of every document, that cite another document, is extracted (110), and then meaningful keywords/word groups (terms) are inferred from the citation context (120).

Figure 1:
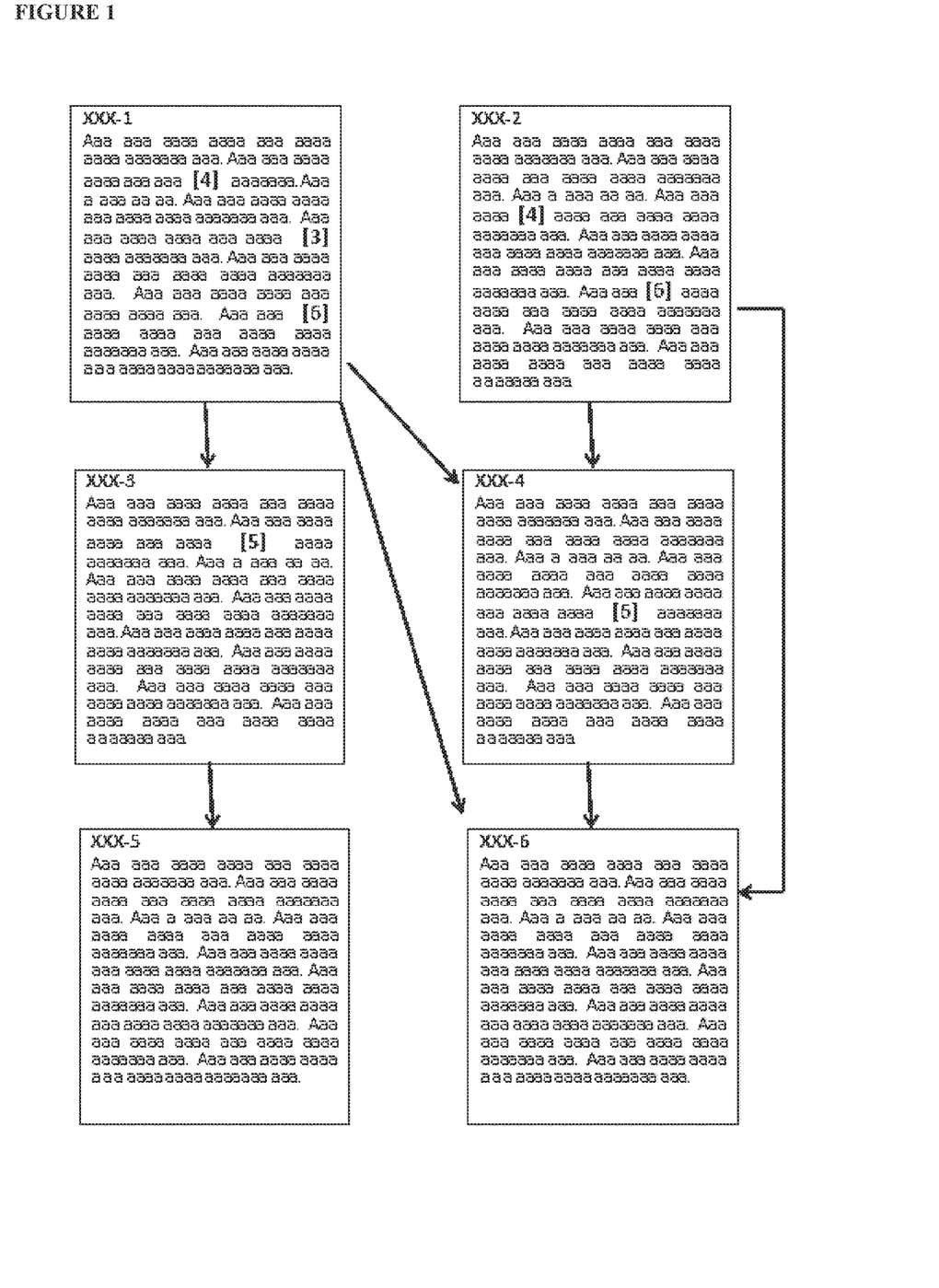
FIG. 1. Citation network of the exemplary pseudo-articles

The best articles are cited by numerous articles with relevant terms in the citation context. This, in turn, shows that the cited document is relevant to the subject. For this, in the method subject to the invention, a simple method is followed for determining/defining the citation terms in the citation context. The terms used for explaining the cited article stand close to the citation point. As also shown in FIG. 1, citation context is the text around the citation marker that is present inside the window, the size of which is predefined. The size of this text can be defined by a specific sentence, word or character number around the citation point. As a result of this, as present in the previous studies, the method subject to the invention also takes the citation context as a window with a fixed size, for example 400 characters in length, around the citation point.

Once citation context is obtained, the next step is the identification of meaningful keywords/word groups (terms) from the citation context of each document (120). A word or a word group, which states something or some concept in a specific field is referred to as "term". Every bigram, that is present in citation context, is used as a definitive term for the cited article. For example, if three articles are cited in the same citation context, every bigram it this content is taken as definitive terms for the three articles. The number of cords, taken as a term, is one or two but it can be expanded for using n-grams of any n. However, bigrams are preferred since they are the most used n-grams for explaining specific terms such as "scale free", "map reduce", and "preferential attachment". While this situation helps inferring meaningful terms from the citation context, it eliminates problems such as synonymous words in the case of single words.

After inferring meaningful terms from the citation context of each document (120), a citation network is formed (130). A citation network is an edge-labeled directed graph, where nodes are the documents. There is a directed edge from the citing article to the cited article. The edge is labeled by the inferred keywords. An edge in a citation network carries a lot more information than merely a binary relationship. The terms that the citing author used for explaining the cited document could be taken from the citation context.

In FIG. 1, an example of a small citation network, formed by six pseudo-articles is given. The citation contexts are underlined, cited articles indicated in brackets, such as "[2]", together with the terms taken from the citation context are emphasized by bold font, such as "term-1".

Figure 2:
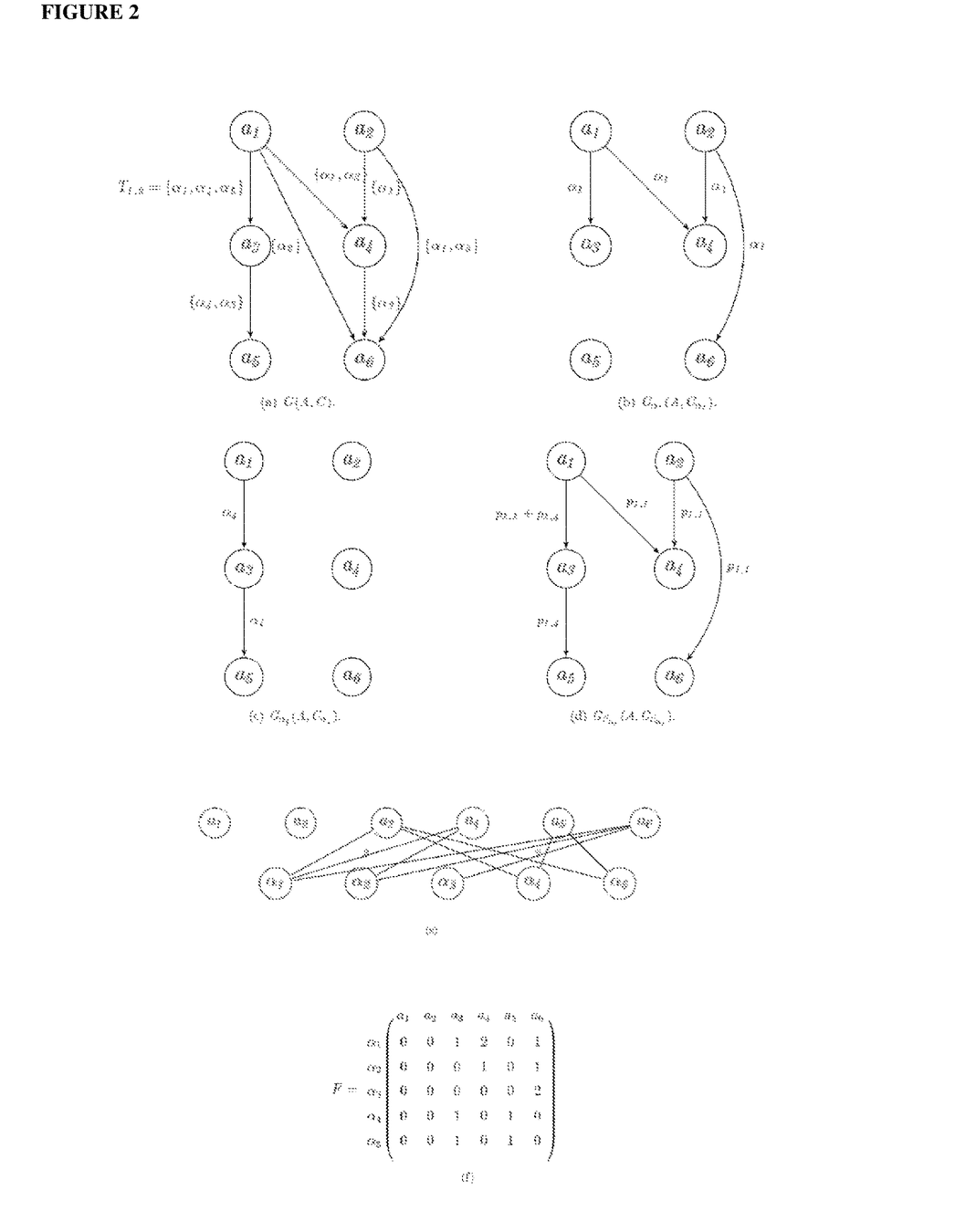
FIG. 2. Citation Networks
Figure 2A:
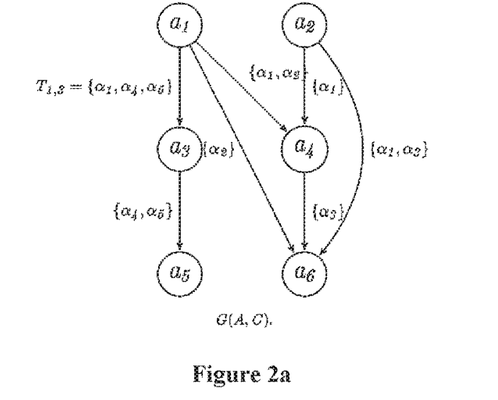
FIG. 2a. Term labeled citation network G(A,C).

For example, the corresponding term labeled citation network of FIG. 1 is given in FIG. 2a, where the set of vertices is $A=\{a_1, a_2, \ldots, a_{|A|}\}$, and $T=\{\alpha_1, \alpha_2, \ldots, \alpha_{|T|}\}$ is the set of terms. The directed edge from $a_1$ to $a_3$ is labeled with terms in set $T_{1,3}=\{\alpha_1, \alpha_4, \alpha_5\}$. The edge $a_1$, $a_2$ is not there since there is no such citation, that is $T_{1,2}$ is the empty set. In other words, edges are labeled with the terms used in the citation context of the citing document while citing. The conventions for A and T are given below.

$A=\{a_1, a_2, \ldots, a_{|A|}\}$ is the set of all documents. Lower case letters of the Latin alphabet such as i, j∈A are used to denote the members of A.

$T=\{\alpha_1, \alpha_2, \ldots, \alpha_{|T|}\}$ is the set of all terms used in all documents in A. Letters of the Greek alphabet such as α, β∈T are used to denote the members of T.

The edge from i to j is labeled by the terms in $T_{ij}$. Set $T_{ij} \subset T$ is the set of all terms, which are in at least one citation context of article i citing article j. If no citation is made from article i to article j, then $T_{ij}$ is the empty set. In the situations where article i cites article j, however there are no terms inside the citation context, then $T_{ij}$ again the empty set. It is also possible that the article i cites article j more than once and a term might be presented in each of these citations. Having used at least once is enough for the term to be in $T_{ij}$.

More formally, the term labeled citation network G(A,C), shown in FIG. 2a, is a directed graph by C ⊂ A×A where the edge is (i, j)∈C, if and only if article i contains at least on citation referring to article j. The edge (i, j)∈C is labeled with all the terms inside $T_{ij}$.

In the exemplary term labeled citation network G(A,C) given in FIG. 2a, the directed edges used for forming citation network between documents $a_1, a_2, a_3, a_4, a_5$ and $a_6$ are labeled with the terms $\alpha_1, \alpha_2, \alpha_3, \alpha_4$ and $\alpha_5$. Document $a_1$ cites document $a_3$. In the citation context it terms uses $\alpha_1$, $\alpha_4$ and α5 In the citation context for $a_4$, there are terms $\alpha_1$ and $\alpha_2$. Similarly, document $a_2$ uses terms $\alpha_1$ for $a_4$ and $\alpha_1$ and $\alpha_3$ for $a_6$.

After constructing the citation network (130), table T constructed T (140). For every citing and cited document pair, there is a row. The terms used in the citation context are inserted into the corresponding row. These terms, though they change according to the content of the cited document, in one example of the invention are "scale free", "preferential attachment", "map reduce". The directed edges used between the citing documents and cited documents are labeled with the terms used in the citation context. An exemplary table T formed for FIG. 2a is shown below in the exemplary table T shown below, $\alpha_1, \alpha_2, \alpha_3, \alpha_4$ and $\alpha_5$ each represent a term.

TABLE 1

The table T which is formed for the G(A, C) term labeled citation network given in FIG. 2a. Contains the citing and cited documents and the terms used in the citation context.

| Cited documents | Words used in citation context | Citing documents |
| --- | --- | --- |
| Document $a_3$ | $\alpha_1, \alpha_4, \alpha_5$ | Document $a_1$ |
| Document $a_4$ | $\alpha_1, \alpha_2$ | Document $a_1$ |
| Document $a_6$ | $\alpha_2$ | Document $a_1$ |
| Document $a_4$ | $\alpha_1$ | Document $a_2$ |
| Document $a_6$ | $\alpha_1, \alpha_3$ | Document $a_2$ |
| Document $a_5$ | $\alpha_4, \alpha_5$ | Document $a_3$ |
| Document $a_6$ | $\alpha_3$ | Document $a_4$ |

In the inventive citation context sensitive searching method (100), after forming the table T containing citing and cited documents and relating terms, a content sensitive search can be initiated.

In the method, in order to initiate a search, first of all keywords/word groups/terms of the subject to be searched are entered (150). In the preferred embodiment of the invention, the entered terms are searched in a table T (160).

Figure 2B:
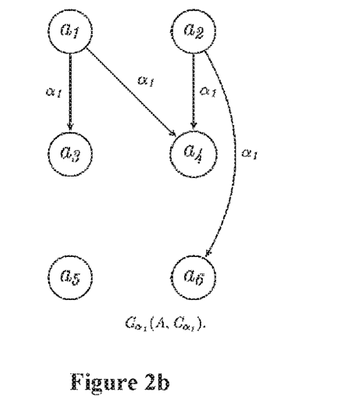
FIG. 2b. Term-$\alpha 1$ specific citation network $G_{\alpha 1}(A, C_{\alpha 1})$ FIG. 2c. Term-$\alpha 4$ specific citation network $G_{\alpha 4}(A, C_{\alpha 4})$ FIG. 2d. Like term citation network. $G_{S\alpha 1}(A, C_{S\alpha 1})$ for set of like terms $S_{\alpha 1}=\{\alpha_1, \alpha_4\}$ FIG. 2e. Bipartite graph of documents versus terms FIG. 2f. Matrix F of terms versus documents FIG. 3. Intersecting terms FIG. 4. Steps of the context sensitive search method.
Figure 2C:
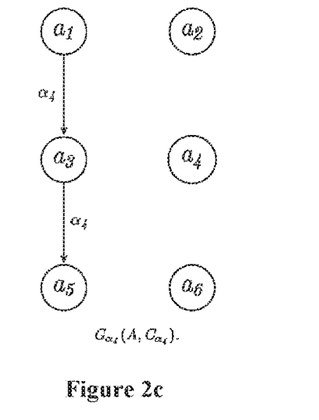

In another embodiment of the invention, for the terms entered for search (for example for $\alpha$) a term-$\alpha$ specific citation network is formed and after that, citing documents, cited documents and entered $\alpha$ in this citation network are written in a table and citing documents corresponding to this value $\alpha$ are determined (160). In an exemplary embodiment of the invention, an example of the term-$\alpha$ specific citation network for $\alpha_1$ and $\alpha_4$ as entered terms, are shown in FIG. 2b and FIG. 2c respectively.

Suppose $\alpha_1$ is the term/keyword for the search. Term $\alpha_1$ is searched inside the table T. All the documents corresponding to $\alpha_1$ in table T are selected and considered as the related document pool (170). Thereby, not only the documents that contain $\alpha_1$, documents related to the subject but do not contain $\alpha_1$ are also selected. Hence access to all documents closely relating to the subject $\alpha_1$ are provided.

After gathering all documents relation to $\alpha_1$ in a document pool, the documents taken from the document pool can be ranked by using any ranking algorithm (180).

In one embodiment of the invention, for ranking the documents related to the subject (180), a simple ranking module, which takes a bigram and gives a ranked list of scientific articles in return is used.

So far search related to term is considered (100). Another method (200), which provides access to the relevant documents by using similar terms, is explained below. Here not only documents gathered in (100), but also documents related to the terms that are similar to the entered terms are considered. So that documents, which are closely related to the subject but which do not contain the keywords can also be reached.

A searching method with similar terms (200), which enables finding the documents, which are closely related to the subject, by using other keywords along with the chosen keywords, reuses steps (110) trough (140) and essentially comprises the steps of;

extracting the citation contexts of each document, that cites at least one document, in a database containing the documents (110), identifying meaningful keywords/word groups from the citation context of each document (120), forming the citation network, an edge-labeled directed graph, where nodes are the documents. There is an edge from the citing article to the cited article and the edge is labeled by the inferred keywords (130), constructing a table T (see Table 1) which contains the citing document, the cited document, and the inferred keywords in the citation (140), entering the keywords/word groups to initiate a search (210), inferring the terms which are similar to the entered keywords (220), as in the case of (160) identifying citing and cited documents in the table T by searching the entered keywords (230), as in the case (160), identifying citing and cited documents in the table T by searching the inferred similar terms (240), forming a relating document pool for all results in the table T corresponding to both the entered keywords and the similar terms (250), as in the case of (180) ranking the documents taken from the document pool using any ranking algorithm (260).

One of the main approaches of the inventive searching method with similar terms (200) is using both the entered and the similar terms in the process of network forming. This helps to expand the selected document set to include documents related to the similar terms.

Figure 3:
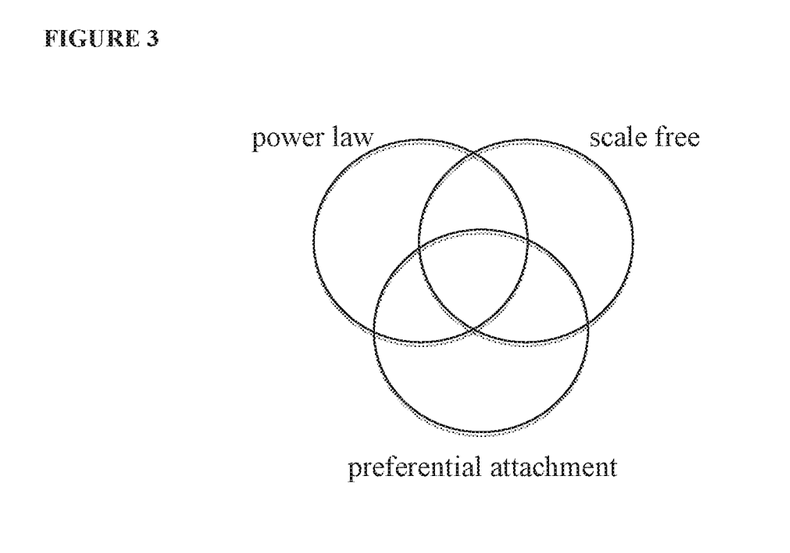
Figure 4:
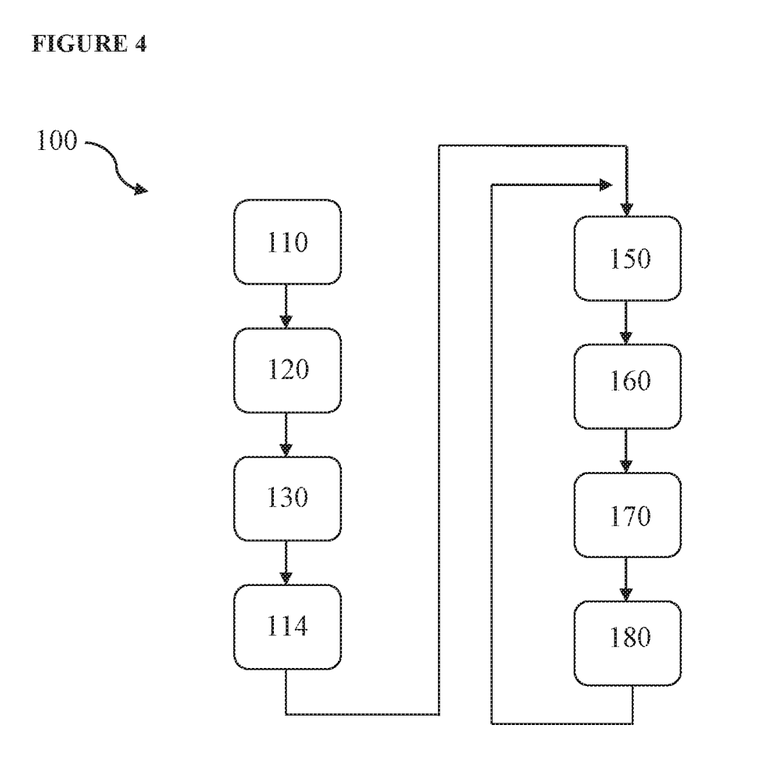
Figure 5:
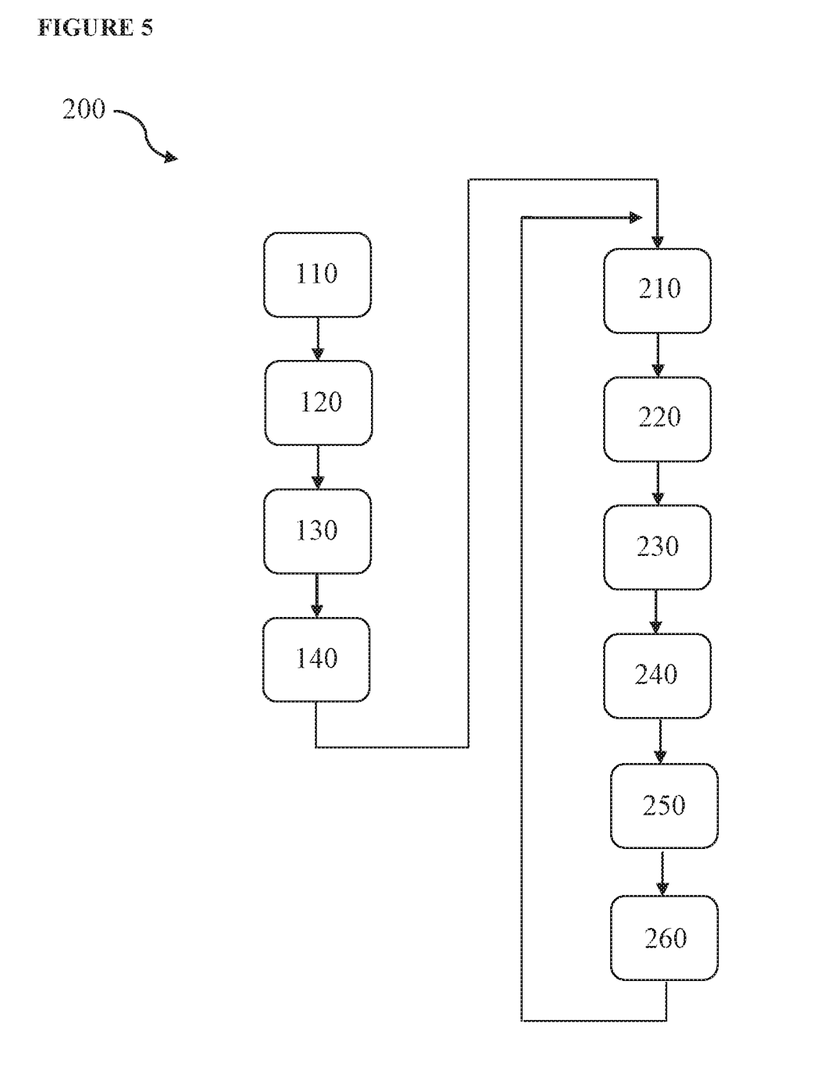
FIG. 5. Steps of the method of searching with like terms.

In scientific publications, one term generally is not sufficient to explain a subject by itself and usage of only a single term is prone to noises because of the natural usage of the language such as synonymous words. For every term, there is a set of articles that contain it. In FIG. 3, as can be seen related to the terms "law of force", "scale free" and "preferential attachment", these article sets substantially coincide for some terms.

In the searching method with similar terms (200), table T is constructed by means of sequence of (110) through (140). After that, in order to initialize the searching process keywords/word groups/terms are entered (210) and the terms that are similar to the entered keywords are inferred (220). In principle two terms are similar if they appear together in a considerable number of citation. Given a term, inferring similar terms requires some tools.

In order to infer the terms which are similar to the entered keywords (220), first a term-article matrix is formed. Similar terms for the given term $\alpha$, is the set of terms which have the article scope which substantially coincides with the article scope of the term $\alpha$.

Term frequencies are related to the articles by a document matrix $F=[f_{\alpha j}]$ which has a size of $|T| \times |A|$. In this matrix, the entry $f_{\alpha j}$ is the count regarding how many articles use the term $\alpha$ in the citation context that cites article j. That is, $f_{\alpha j}$ is the in-degree of article j in term-$\alpha$ graph $G_\alpha$. Therefore F is actually the adjacency matrix of the weighted bipartite graph between the article nodes and term nodes.

Figure 2D:
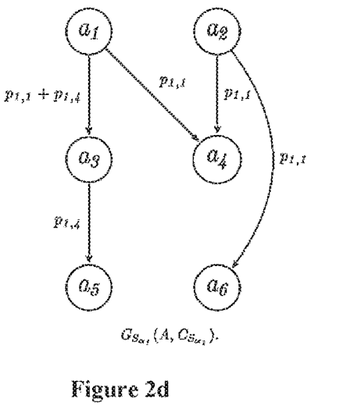
Figure 2E:
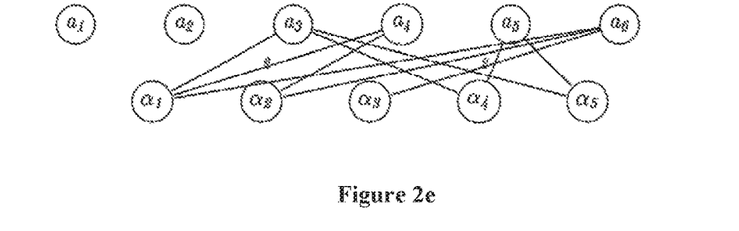
Figure 2F:
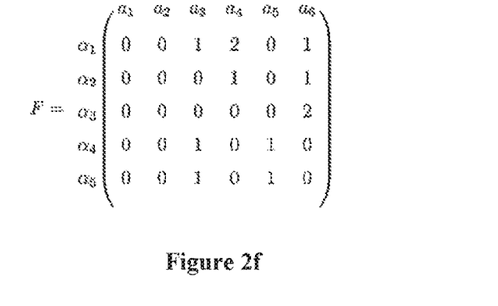

An example the bipartite graph given in FIG. 2e is obtained from term labeled citation network as in FIG. 2a. The corresponding related term document matrix F is shown in FIG. 2f.

In the inventive searching method with similar terms (200), there are distinguishing terms which are used for especially defining smaller article sets are present as similar terms. Simple term frequency has a problem of assuming every one of the terms to have the same importance, however some terms have very little or no distinguishing power. For example, it is possible for almost the entire citation context of an article collection on the topic "cancer" to contain the term "cancer". For this, the weights of the terms, which are present in numerous citation contexts, are lowered. In principle, the idea is reducing term frequency weight of a term by a factor that grows with its citation context frequency it appears. Term frequency-inverse document frequency (tf-idf) is a technique which is based on this idea. This method is widely used in information retrieval and text mining and it reflects how important a word is to a document in a collection. For this reason, in the inventive method (200), this technique is used for weighting the term frequencies.

The inverse document frequency for term $\alpha$ is defined by $g(\alpha)$, $$g(\alpha) = \log \frac{|A|}{\sum_{j=1}^{|A|} \text{sgn}(f_{\alpha j})}$$

where sgn(x) is a signum function designed as $$\text{sgn}(x) = \begin{cases} 1, & x > 0, \\ 0, & x = 0, \\ -1, & x < 0. \end{cases}$$

Afterwards, let us assume that $D=[d_{\alpha\beta}]$ is a $|T|\times|T|$ diagonal matrix defined with below:

$$d_{\alpha\beta} = \begin{cases} g(\alpha), & \alpha = \beta, \\ 0, & \alpha \neq \beta. \end{cases}$$

We define the weighted term document Matrix $N=[n_{\alpha\beta}]$ of size $|T|\times|A|$ with $N=D\times F$.

Afterwards, a relationship between the terms is established. $\alpha$ and $\beta$ are assumed, to be the $\alpha^{th}$ and $\beta^{th}$ row vectors of N respectively, and the members $\alpha$ and $\beta$ show the related weighted term frequencies of $\alpha$ and $\beta$ for the articles inside the data set. In order to learn how much of the scopes of the articles of these terms coincide, comparison of the corresponding row vectors of $\alpha$ and $\beta$ is realized. For this, in a preferred embodiment of the invention, as a measure towards the power linear correlation between two sample terms. Pearson Correlation Coefficient, which is widely used in the field of science, is used.

Afterwards, a Sample Pearson Correlation Matrix $P=[p_{\alpha\beta}]$ of size $|T|\times|T|$ is defined and $P_{\alpha\beta}$ $$p_{\alpha\beta} = \frac{\sum_{i=1}^{|A|}(\alpha_i - \overline{\alpha})(\beta_i - \overline{\beta})}{\sqrt{\sum_{i=1}^{|A|}(\alpha_i - \overline{\alpha})^2}\sqrt{\sum_{i=1}^{|A|}(\beta_i - \overline{\beta})^2}}$$

is the Sample Pearson Correlation between term $\alpha$ and $\beta$ where $\alpha$ and $\beta$ are the $\alpha^{th}$ $\beta^{th}$ row vectors of N. The vector $\overline{\alpha}$ is the average of the entrance of the vector $\alpha$.

The sample Pearson Correlation Coefficient is the measure of the linear correlation between two samples X and Y, and it can give a value between −1 and 1 (including −1 and 1). A value of 1 means that a linear equation defines the relationship between X and Y, and all data points are located on a line where Y increases with increasing X. A value of −1 means that all data points are located on a line where Y decreases with increasing X. This case is irrelevant for our data set, because, in order to take the value −1 for two terms $\alpha$ and $\beta$, they need to be complementary to each other. This is not possible for large article collections. The value 0 means that there is no linear correlation present between the samples.

For a given term $\alpha$, the similar term set $S_\alpha$ is defined as $S_\alpha=\{\beta\in T|p_{\alpha\beta}>\delta\}$ for some value $0<\delta<1$. $\delta$ is the cross validation parameter and the value of $\delta$ changes between topics. Additionally, similarity point $p_{\alpha\alpha}$ for term $\alpha$ equals to 1. For this reason, since $\alpha\in S_\alpha$, $S_\alpha$ is not empty.

Weighted citation network which takes term $\alpha$ as basis and which is directed from the term set $S_\alpha$ is defined as follows:

The sub graphic $G_{S\alpha}(A, C_{S\alpha})$ of $G(A, C)$ is named as the citation network of the set of similar terms, where
(i) $C_{S\alpha}=\cup_{\beta\in S\alpha}C_\beta$
(ii) the weight of the edge $(i, j)\in C_{S\alpha}$ equals to the sum of weights of the edges combined $w_{ij}=\Sigma_{(ij)\in T_{ij}\cap S_\alpha}P_{\alpha\beta}$.

For example from FIG. 2a, suppose $S_{\alpha 1}=\{\alpha_1, \alpha_4\}$ is the similarity set for a given term $\alpha_1$ and $\delta$. Then, the network of similar terms set $G_{S\alpha 1}(A, C_{S\alpha 1})$ for term $\alpha_1$ is shown in FIG. 2d.

The keywords entered, in the inventive method (200), are searched in table T and related documents are identified (230).

In another embodiment of the invention, the citation network of terms similar to given term $\alpha$ is formed in (220). Therefore table T contains the documents related to similar terms to the entered keyword.

In another embodiment of the invention, after forming the citation network of similar terms set is formed for a given term $\alpha$, terms (for example $\alpha_1$ and $\alpha_4$) similar to the entered keyword ($\alpha$), the documents citing using these similar terms in the citation context and cited documents are written in the table T. Thus, cited documents corresponding to the entered keyword ($\alpha$) and the terms that are similar to the entered keyword/keywords ($\alpha_1$ and $\alpha_4$), in other words documents closely related to the subject are determined.

Thus, documents closely related to the subject can be determined by means of another search in the table T for the terms similar to the entered (240). Thus, the documents related to the entered keywords, and the documents related to similar terms, that is, closely related to the subject, are determined (250).

After the cited documents corresponding to the entered keyword and the similar terms are collected in a data pool (250).

The related documents, in the sense of both entered keywords and the similar terms, taken into the data pool. Then so selected documents are ranked by using any ranking algorithm (260).

What is claimed is:

1. A citation context sensitive search method for accessing to related documents by chosen keywords, the method comprising:
   extracting citation context of each document, that cites at least one document, in a database containing documents, the citation context is determined as a text in a window of predetermined size around a citation marker in a citing document, wherein the citation context is determined as a text around the citation marker inside the window;
   identifying meaningful keywords from the citation context of the citing document for each cited document;
   forming a citation network, wherein the citing document and the cited documents form nodes of the citation network, a first node corresponding to the citing document is connected to all the nodes corresponding to the cited documents forming edges of the citation network, wherein each edge of the citation network is labelled with an inferred keyword, the inferred keyword is an identified meaningful keyword from the citation context of the citing document corresponding to the cited document forming the edge;

constructing a table T comprising sets of the citing document, the cited document, and the inferred keywords in the citation, receiving keywords to initiate a search, identifying citing and cited documents by searching the keywords in the table T, forming a related document pool by adding the citing and the cited documents identified in the table T and related citation networks for the inferred keywords corresponding to the keywords, ranking the documents of the related document pool by using a graph based ranking algorithm running on the union of the related citation networks.

2. The method of claim 1, wherein in the step of "identifying meaningful keywords from the citation context of each document", every term in the citation context is the inferred keyword.

3. The method of claim 1, wherein in the step of "identifying meaningful keywords from the citation context of each document", every term in the citation context is used as a definitive term for articles in the citation context.

4. The method of claim 1, wherein in the step of "identifying meaningful keywords from the citation context of each document", the meaningful keywords are single words, or bigrams.

5. The method of claim 1, wherein in the step of "identifying citing and cited documents by searching the keywords in the table T", the keywords are searched in the table T constructed by using the inferred keywords of the citation network.

6. The method of claim 1, wherein in the step of "identifying citing and cited documents by searching the keywords in a table T", for a keyword α for the search, looking up the keyword α in the table T and identifying citing and cited documents corresponding to the keyword α and constructing a term-α specific citation network, wherein the citation and cited documents corresponding to the keyword α form nodes of the term-α specific citation network and edges from the citing documents to the cited documents are labelled with term α.

7. The method of claim 1, wherein in the step of "ranking the documents of the related document pool by using a graph based ranking algorithm running on the union of the related citation networks", a simple ranking module which takes keywords, constructs the union of term labeled citation networks for each keyword and the graph based ranking algorithm is run on the union of the citation networks to generate a ranked list of the related documents.

8. A method for finding documents which are closely related to a subject, by using other keywords along with chosen keywords, in the case where a same document is referred to by multiple documents and by multiple keywords, the method comprising:

extracting citation context of each document, that cites at least one document, in a database containing documents, the citation context is determined as a text in a window of predetermined size around a citation marker in a citing document, wherein the citation context is determined as a text around the citation marker inside the window;

identifying meaningful keywords from the citation context of the citing document for each cited document;

forming a citation network, wherein the citing document and the cited documents form nodes of the citation network, a first node corresponding to the citing document is connected to all the nodes corresponding to the cited documents forming edges of the citation network, wherein each edge of the citation network is labelled with an inferred keyword, the inferred keyword is an identified meaningful keyword from the citation context of the citing document corresponding to the cited document forming the edge;

constructing a table T comprising sets of the citing document, the cited document, and the inferred keywords in the citation, receiving keywords from a user to initiate a search, inferring terms which are similar to the keywords, identifying the citing and cited documents in the table T by searching the keywords and the inferred similar terms in the table T, forming a relating document pool for all results in the table T corresponding to both the keywords and the inferred similar terms, ranking the documents of the relating document pool by using a graph based ranking algorithm running on citation networks of the set of the keywords and the similar terms.

9. The method of claim 8, wherein in the step of "inferring terms which are similar to the keywords", the terms which are similar to the keywords are terms that are frequently used together with the keywords in the citations.

10. The method of claim 8, wherein in the step of "inferring terms which are similar to the keywords", as a measure towards a power linear correlation between two sample terms, Pearson Correlation Coefficient is used.

11. The method, of claim 8, wherein the keywords in the step "identifying the citing and cited documents in the table T by searching the keywords and the inferred similar terms in the table T" are searched in the table T documents that cite using the keywords and the similar terms and the documents that are cited using the keywords and similar terms are identified.

12. The method of claim 8, wherein after forming the citation network of the similar terms for a given term α in the step "identifying the citing and cited documents in the table T by searching the keywords and the inferred similar terms in the table T", for a keyword α or the similar terms for the search, looking up the keyword α in the table T and identifying citing and cited documents corresponding to the keyword α and constructing a term-α specific citation network, wherein the citation and cited documents corresponding to the keyword α form nodes of the term-α specific citation network and edges from the citing documents to the cited documents are labelled with term α; and then using the term-α specific citation network for graph ranking.

13. The method of claim 9, wherein in the step of "inferring terms which are similar to the keywords", for finding distinguishing terms which are used for defining smaller article sets that are present as similar terms, in order to lower a term weight of a term by a factor increasing with a frequency of appearance of the term in the citation contexts, a term frequency-inverse document frequency technique is used.

14. The method of claim 8, wherein in the step of "ranking the documents of the relating document pool by using a graph based ranking algorithm running on citation networks of the set of the keywords and the similar terms", a simple ranking module which takes keywords, constructs the union of term labeled citation networks for each keyword and similar terms and the graph based ranking algorithm is run on the union of the citation networks to generate a ranked list of the related documents.

* * * * *